US012732931B2

(12) United States Patent
Wu et al.

(10) Patent No.: US 12,732,931 B2
(45) Date of Patent: Sep. 8, 2026

(54) METHOD AND DEVICE FOR ACCESS CONTROL FOR TIMING RELATED STATUS UPDATE

(71) Applicant: Nokia Technologies Oy, Espoo (FI)

(72) Inventors: Chunli Wu, Beijing (CN); Samuli Heikki Turtinen, Oulu (FI); Jussi-Pekka Koskinen, Oulu (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 340 days.

(21) Appl. No.: 18/428,030

(22) Filed: Jan. 31, 2024

(65) Prior Publication Data

US 2024/0284353 A1 Aug. 22, 2024

(30) Foreign Application Priority Data

Feb. 17, 2023 (WO) ................ PCT/CN2023/076955

(51) Int. Cl.
*H04W 56/00* (2009.01)
*H04W 48/18* (2009.01)

(52) U.S. Cl.
CPC ......... *H04W 56/001* (2013.01); *H04W 48/18* (2013.01)

(58) Field of Classification Search
CPC ... H04W 56/001; H04W 48/18; H04W 48/02; H04W 48/16; H04W 74/0833; H04W 56/0015; H04W 74/004; H04W 74/006; H04W 48/08; H04W 68/02; H04W 72/1268; H04W 76/28
See application file for complete search history.

(56) References Cited

U.S. PATENT DOCUMENTS

2006/0034208 A1 2/2006 Blouin
2018/0324681 A1 11/2018 Yilmaz et al.
2019/0230585 A1* 7/2019 Chun .................... H04W 12/08
2019/0320354 A1* 10/2019 Kim ...................... H04L 1/1819
2021/0195635 A1 6/2021 Wanstedt et al.

FOREIGN PATENT DOCUMENTS

CN 101346906 A 1/2009
CN 111492693 A 8/2020
CN 111615848 A 9/2020
WO 2021/155588 A1 8/2021
WO 2021/211033 A1 10/2021
WO 2022/197844 A1 9/2022

OTHER PUBLICATIONS

Office action received for corresponding European Patent Application No. 24153860.2, dated Sep. 11, 2025, 7 pages.
Extended European Search Report received for corresponding European Patent Application No. 24153860.2, dated Jul. 4, 2024, 14 pages.

(Continued)

*Primary Examiner* — Afshawn M Towfighi
(74) *Attorney, Agent, or Firm* — McCarter & English, LLP

(57) ABSTRACT

Embodiments of the present disclosure disclose devices, methods and apparatuses for timing related status update. A terminal device identifies an access attempt for a network timing related status update; and performs an access control on the access attempt for the network timing related status update.

20 Claims, 6 Drawing Sheets

(56) References Cited

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

"New SID on Study on 5G Timing Resiliency and TSC enhancements", TSG SA Meeting #SP-94E, SP-211634, Agenda: 9.1.4, Nokia, Dec. 14-20, 2021, 5 pages.

"3rd Generation Partnership Project; Technical Specification Group Services and System Aspects; Study on timing resiliency and TSC and URLLC enhancements (Release 18)", 3GPP TR 23.700-25, V18.0.0, Dec. 2022, pp. 1-105.

"TR 23.700 KI#1 conclusion update", 3GPP TSG-SA2 Meeting #154-AH-e, S2-2301461, Nokia, Jan. 16-20, 2023, pp. 1-5.

"Proposed method for Time Synchronization status reporting to UE(s)", 3GPP TSG SA WG2 Meeting SA2#154-AH-e, S2-2301463, SA2, Jan. 16-20, 2023, 2 pages.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Services and System Aspects; Service requirements for the 5G system; Stage 1 (Release 19)", 3GPP TS 22.261, V19.1.0, Dec. 2022, 115 pages.

"3rd Generation Partnership Project; Technical Specification Group Core Network and Terminals; Non-Access-Stratum (NAS) protocol for 5G System (5GS); Stage 3; (Release 18)", 3GPP TS 24.501, V18.1.0, Dec. 2022, pp. 1-1031.

International Search Report and Written Opinion received for corresponding Patent Cooperation Treaty Application No. PCT/CN2023/07695, dated Nov. 8, 2023, 7 pages.

* cited by examiner

METHOD AND DEVICE FOR ACCESS CONTROL FOR TIMING RELATED STATUS UPDATE

CROSS-REFERENCE TO RELATED APPLICATION

This application claims priority from PCT Application No. PCT/CN2023/076955, filed on Feb. 17, 2023, the contents of which are hereby incorporated by reference in their entirety.

FIELD

Embodiments of the present disclosure generally relate to the field of communication, and in particular, to devices, methods, apparatuses and computer readable storage medium for timing related status update.

BACKGROUND

Clock quality information update is one of key aspects necessary to provide communication services for time-sensitive applications. In the Rel-18, 5G timing resiliency and time-sensitive communication (TSC) & ultra-reliable low latency communications (URLLC) enhancements are under study. The network side may, provide timing related status change in system information block (SIB). UE may decide to get reconnected to the network for more detailed information on the timing synchronization.

In the communication systems, there are enormous number of terminal devices. The efficient and effective network timing synchronization status update for these terminal devices is still challenge. Therefore, there is a need to enhance timing related status update.

SUMMARY

In general, example embodiments of the present disclosure provide devices, methods, apparatuses and computer readable storage medium for timing related status update.

In a first aspect, there is provided a terminal device. The terminal device comprises at least one processor; and at least one memory including computer program codes, wherein the at least one memory and the computer program codes are configured to, with the at least one processor, cause the terminal device to: identify an access attempt for a network timing related status update; and perform an access control on the access attempt for the network timing related status update.

In a second aspect, there is provided a network device. The network device comprises at least one processor; and at least one memory including computer program codes, wherein the at least one memory and the computer program codes are configured to, with the at least one processor, cause the network device to: transmit, to a terminal device, one or more parameters for configuring the terminal device to perform an access control on a timing related status update access attempt; and receive, from the terminal device, an access attempt which is access controlled based on the one or more parameters.

In a third aspect, there is provided a method implemented at a terminal device. The method comprises: identifying, by the terminal device, an access attempt for a network timing related status update; and performing, by the terminal device, an access control on the access attempt for the network timing related status update.

In a fourth aspect, there is provided a method implemented at a network device. The method comprises: transmitting, to a terminal device, one or more parameters for configuring the terminal device to perform an access control on a timing related status update access attempt; and receiving, from the terminal device, an access attempt which is access controlled based on the one or more parameters.

In a fifth aspect, there is provided an apparatus of a terminal device. The apparatus comprises: means for identifying, by the terminal device, an access attempt for a network timing related status update; and means for performing, by the terminal device, an access control on the access attempt for the network timing related status update.

In a sixth aspect, there is provided an apparatus of a network device. The apparatus comprises: means for transmitting, to a terminal device, one or more parameters for configuring the terminal device to perform an access control on a timing related status update access attempt; and means for receiving, from the terminal device, an access attempt which is access controlled based on the one or more parameters.

In a seventh aspect, there is provided a terminal device. The terminal device comprises one or more transceivers; and one or more processors coupled to the one or more transceivers, wherein the one or more transceivers are configured with the one or more processors to cause the terminal device to: identify an access attempt for a network timing related status update; and perform an access control on the access attempt for the network timing related status update.

In an eighth aspect, there is provided a network device. The network device comprises one or more transceivers; and one or more processors coupled to the one or more transceivers, wherein the one or more transceivers are configured with the one or more processors to cause the network device to: transmit, to a terminal device, one or more parameters for configuring the terminal device to perform an access control on a timing related status update access attempt; and receive, from the terminal device, an access attempt which is access controlled based on the one or more parameters.

In a ninth aspect, there is provided a non-transitory computer readable medium comprising program instructions for causing an apparatus to perform at least the method according to any of the third or fourth aspect.

In a tenth aspect, there is provided a computer program comprising instructions, which, when executed by an apparatus at a terminal device, cause the apparatus at least to: identify an access attempt for a network timing related status update; and perform an access control on the access attempt for the network timing related status update.

In a eleventh aspect, there is provided a computer program comprising instructions, which, when executed by an apparatus at a network device, cause the apparatus at least to: transmit, to a terminal device, one or more parameters for configuring the terminal device to perform an access control on a timing related status update access attempt; and receive, from the terminal device, an access attempt which is access controlled based on the one or more parameters.

In a twelfth aspect, there is provided a terminal device. The terminal device comprises identifying circuitry configured to identify an access attempt for a network timing related status update; and performing circuitry configured to perform an access control on the access attempt for the network timing related status update.

In a thirteenth aspect, there is provided a network device. The network device comprises transmission circuitry configured to transmit, to a terminal device, one or more parameters for configuring the terminal device to perform an access control on a timing related status update access attempt; and receiving circuitry configured to receive, from the terminal device, an access attempt which is access controlled based on the one or more parameters.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
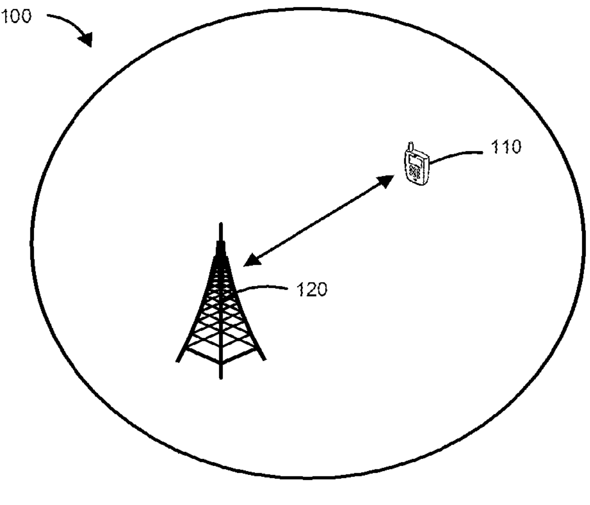
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G), sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a new radio (NR) NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the Rel-18 Study on 5G Timing Resiliency and TSC & URLLC enhancements for the radio access network (RAN) clock quality information update, SIB is proposed to provide timing synchronization status change and the UE may decide to get reconnected for more detailed information.

The network timing synchronization status information from RAN or user plane function/network-side time-sensitive network (TSN) translator (NW-TT) can contain the following parameters: node's synchronization state, node's synchronization performance, primary source description, and primary source event.

Timing synchronization status update is a new use case for the UE to get connected and while the UE is performing back off (T390 is running for certain Access Category), there might be other triggers that trigger RRC connection establishment as well. Currently, it is not clear how the different triggers may interact with each other.

In addition, the inventors notice that a large number of UE may read the system information triggering these UE to retrieve the latest available clock quality information. These UE may access the network to retrieve the clock quality information at the same time, which will likely cause a congestion. Thus, it is not desired that the UE always transitions to radio resource control (RRC) connected state (RRC_CONNECTED state or mode) immediately to retrieve the latest available clock quality information. Instead, it would be beneficial to avoid this congestion by spreading the UEs' connection attempts in the time domain.

In the present disclosure, there is provided an improved solution for timing related status update, to perform an access control on access attempts for timing related status update to reduce or even avoid the congestion of network side.

In some embodiments, the terminal device may identify an access attempt for a network timing related status update. After that, the terminal device may perform an access control on the access attempt for the network timing related status update.

With the solution as proposed herein, the congestion of network side due to network timing related status update may be substantially reduced or even avoided, thereby providing efficient and effective network timing synchronization status update.

Hereinafter, principle and embodiments of the present disclosure will be described in detail below with reference to the accompanying drawings. Reference is first made to FIG. 1, which illustrates an example network environment 100 in which example embodiments of the present disclosure can be implemented.

The network environment 100, which may be a part of a communication network, comprises a terminal device 110 and a network device 120 communicating with each other or with other devices via each other.

The network environment 100 may comprise any suitable number of devices and cells. In the network environment 100, the terminal device 110 and the network device 120 can communicate data and control information with each other. A link from the network device 120 to the terminal device 110 is referred to as a DL, while a link from the terminal device 110 to the network device 120 is referred to as a UL.

It is to be understood that the number of the terminal device 110, and the number of the network device 120 as shown in the communication network environment 100 are only for the purpose of illustration, without any limitation to the scope of the present disclosure. In some example embodiments, the communication network environment 100 may include any number of terminal devices, and/or any number of network devices.

The communications in the network environment 100 may follow any suitable communication standards or protocols, which are already in existence or to be developed in the future, such as universal mobile telecommunications system (UMTS), long term evolution (LTE), LTE-advanced (LTE-A), the fifth generation (5G) new radio (NR), the sixth generation (6G) or beyond, wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), bluetooth, ZigBee, and machine type communication (MTC), enhanced mobile broadband (eMBB), massive machine type communication (mMTC), ultra-reliable low latency communication (URLLC), carrier aggregation (CA), dual connectivity (DC), and new radio unlicensed (NR-U) technologies.

In some example embodiments, the network device 120 may transmit network timing related status information to the terminal device 110. Based on the network timing related status information transmitted by the network device 120, the terminal device 110 may determine whether the RAN clock quality information has been changed. When the terminal device determines that the RAN clock quality information has been changed, the terminal device 110 may need to retrieve the latest available clock quality information. In other words, the terminal device 110 may need to perform a network timing related status update. For example, the terminal device 110 may initiate an access attempt, to obtain the detailed timing related information (For example, the latest clock quality information) from the network device 120.

In some example embodiments, the terminal device 110 may identify an access attempt for a network timing related status update; and perform an access control on the access attempt for the network timing related status update.

Figure 2:
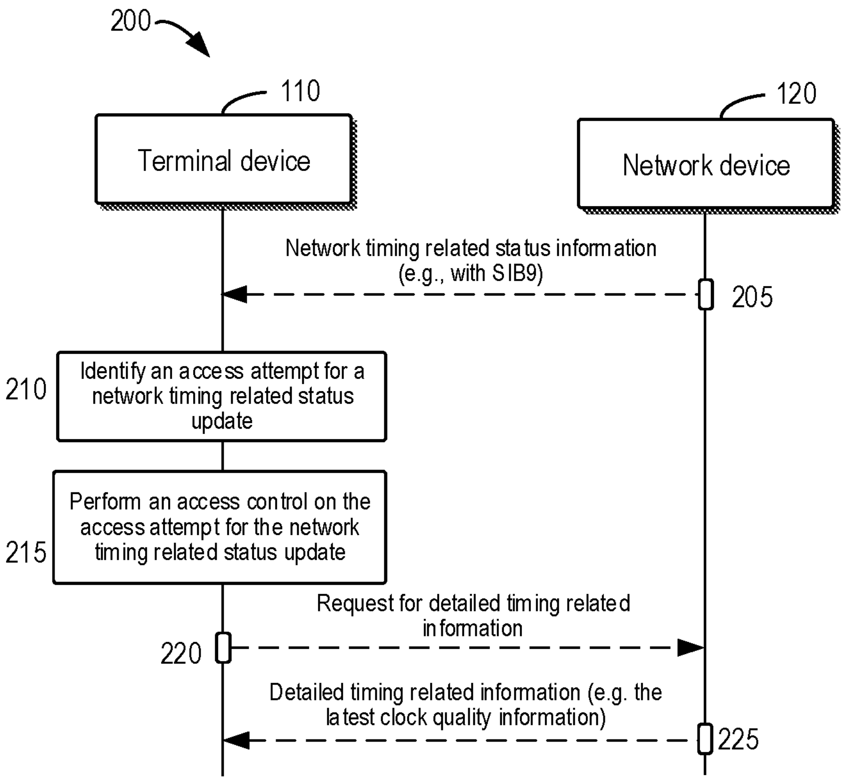
FIG. 2 illustrates an example signaling flow between a terminal device and a network device according to some example embodiments of the present disclosure.

FIG. 2 illustrates an example signaling flow 200 between a terminal device and a network device according to some example embodiments of the present disclosure. For the purpose of discussion, the signaling flow 200 will be described with reference to FIG. 1.

As shown in FIG. 2, the network device 120 transmits 205 (e.g., with SIB9) network timing related status information to the terminal device 110. For example, the network timing related status information from the network device 120 (i.e., from RAN or UPF/NW-TT) can contain the following parameters: node's synchronization state, node's synchronization performance, primary source description, and primary source event.

Upon reception of the network timing related status information, the terminal device 110 may determine whether the RAN clock quality information has been changed.

The terminal device may determine that the RAN clock quality information was changed using:

- SIB broadcast information to enable UEs in RRC_IDLE and RRC_INACTIVE and in the case of RRC_CONNECTED UEs, dedicated RRC signalling, to enable UEs to determine that:
  - the timing synchronization status of the cell that the UE is camping on has changed;
  - the timing synchronization status of the new cell the UE is camping on after cell reselection is different compared to the timing synchronization status of the cell that the UE was previously camping on.
- If the UE has determined that the RAN clock quality information has changed and the UE has been requested by the TSCTSF to connect to the network in the case that the RAN clock quality information changes, the UE performs a registration (if the UE is in RRC_IDLE) or the UE Triggered Connection Resume in RRC Inactive procedure (if the UE is in RRC_INACTIVE).

The UE in RRC_INACTIVE or RRC_IDLE state may be informed about a change of the RAN clock quality information:

- The gNB includes in SIB9 a reference report ID as a notification for the UEs reading the SIB9 that there is new clock quality information available. The UE compares the reference report ID with locally stored reference report ID to determine if it had retrieved the last available clock quality information already.
- The reference report ID consists of the scope of the report ID and an event ID (an integer). A Scope may either identify a group of cells within a single gNB or a group of cells across gNBs. The latter would reduce the amount of signalling even further since then UEs that move to another gNB would not need to retrieve the clock quality details.

Thus, as an example, a system information block for example SIB9 may include a reference report ID, which may be used as a notification for the terminal device 110. In other word, the terminal device may read the SIB9 to determine whether there is new clock quality information available. For example, the UE may compare the reference report ID with locally stored reference report ID to determine if it had retrieved the latest available clock quality information already. If the RAN clock quality information has been changed, the terminal device 110 may decide to initiate an access attempts for the network timing related status update.

It is to be noticed that the above identifying manner is only for illustrative purpose, it is also possible to use any different manner.

At the terminal device 110, the terminal device 110 may identify 210 an access attempt for a network timing related status update, as shown in FIG. 2. Usually, there are many types or access categories of access attempts, which are triggered due to different reasons or causes. Therefore, to perform access control, it is required to first identify the access attempt for a network timing related status update.

In some embodiments, the unified access control (UAC) framework may be modified to facilitate the identification of an access attempt for a network timing related status update. The UAC framework is a framework in the current 5G NR systems, which enables a unified access control on access attempts before an RRC connection establishment (for UE in RRC_IDLE) or an RRC connection resume (for UE in INACTIVE).

In order to enable access control on the access attempt for timing related status update (triggered by SIB indication), a new access category and/or access identity may be defined for such an access attempt.

In some example embodiments, the access identity may be predefined as a reserved value for an access identity number in the UAC framework. For illustrative purposes, an example access identities as specified in TS 22.261 are given as follows

TABLE 1

| Access Identities | |
|---|---|
| Access Identity number | UE configuration |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3 | UE for which Disaster Condition applies (note 4) |
| 4-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

In Table 1, the access identity 1 is used by UEs configured for MPS, in the Public Land Mobile Networks (PLMNs) where the configuration is valid. The PLMNs where the configuration is valid are HPLMN, PLMNs equivalent to HPLMN, and visited PLMNs of the home country. In addition, access identity 1 is also valid when the UE is explicitly authorized by the network based on specific configured PLMNs inside and outside the home country.

The access identity 2 is used by UE configured for MCS, in the PLMNs where the configuration is valid. The PLMNs where the configuration is valid are HPLMN or PLMNs equivalent to HPLMN and visited PLMNs of the home country. The access identity 2 is also valid when the UE is explicitly authorized by the network based on specific configured PLMNs inside and outside the home country.

The access identity 3 is used by UE for which disaster condition applies and the configuration is valid for PLMNs that indicate to potential Disaster Inbound Roamers that the UEs can access the PLMN. The access identities 4 to 10 are reserved for future use.

The access identities 11 and 15 are valid in Home PLMN only if the EHPLMN list is not present or in any EHPLMN; the access identities 12, 13 and 14 are valid in Home PLMN and visited PLMNs of home country only. For this purpose, the home country is defined as the country of the MCC part of the IMSI.

From Table 1, it is seen that the access identities 4 to 11 are not used but still reserved. Thus, the access identity may be predefined as being one of "access identity numbers" of 4 to 10. For example, any of access identities 4 to 11 may defined as for UE that triggers a timing related status update access attempt.

In some example embodiments, the access identity may be predefined as a used value for access identity number in the UAC framework. In some example embodiments, the access identity may be predefined as being one of "Access Identity numbers" of except 4 to 10. For example, any of access identities 1 to 3 and 11 to 15 may be re-defined additionally for UE that triggers a timing related status update access attempt.

Additionally or alternatively, a new access category may be defined. For illustrative purposes, an example access identities as specified in TS 22.261 are given as follows:

TABLE 2

Access Categories

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1. | MO signalling on RRC level resulting from other than paging |
| 9 | All except for the conditions in Access Category 1. | MO IMS registration related signalling (NOTE 5) |
| 10 (NOTE 6) | All | MO exception data |
| 11-31 | | Reserved standardized Access Categories |
| 32-63 (NOTE 2) | All | Based on operator classification |

In Table 2, 8 bits are used to indicate access category number, there are 64 values, wherein values 11 to 31 are reserved for further use and values 0 to 10 and 32 to 63 are used. Therefore, similar to access identity, it may define a new access category for gory and the access identity are mapped to a timing related status update, and any of the reserved bit of "Access Category number" may be used. Alternatively, it may also combine the timing related status update into the existing access category which should be barred.

In some example embodiments, the access attempt may be identified based on one or more of an access category or an access identity, and the access category and the access identity are mapped to a timing related status update access attempt. For example, a mapping of the access category or the access identity to a timing related status update access attempt may be predefined for example by the standards, specification, etc. Additionally or alternatively, a mapping of the access category or the access identity to a timing related status update access attempt may be preconfigured by the network device 120.

In some example embodiments, the access category or the access identity may be encoded in subscriber identity module (SIM) module or a universal SIM (USIM) module.

Based on the new access category and/or the new access identity, the network device may identify an access attempt for a network timing related status update. For example, the terminal device may determine whether the access category and/or the access identity associated with the access attempts corresponds to the new access category and/or access identity defined for a network timing related status update. If so, then an access attempt for a network timing related status update is identified.

In some embodiments, the identifying of the access random for a network timing related status update may be performed in other ways than UAC. For example, the access attempt itself may provide a specific identity, which may be used to identify such an access attempt.

Referring back to FIG. 2, upon identifying an access attempt for a network timing related status update, the terminal device 110 may perform 215 the access control on the access attempt, to for example by spreading the UEs' connection attempts in the time domain.

In some example embodiments, the access control may be based on the unified access control (UAC) framework.

The UAC defined in RRC may allow some randomization of UEs getting access when the cell is congested. In some example embodiments, the terminal device may receive, from a network device, one or more UAC parameters dedicated for the access category or the access identity mapped to the timing related status update access attempt.

The information element (IE) UAC-BarringInfoSetList provides a list of access control parameter sets. An access category can be configured with access parameters according to one of the sets. The IE UAC-BarringInfoSetList include uac-BarringFactor, a uac-BarringTime, and uac-BarringForAccessIdentity. The uac-BarringForAccessIdentity indicates whether access attempt is allowed for each access identity. The bits 0 to 6 in the bit string corresponds to access identity 1, access identity 2, access identity 11, access identity 12, access identity 13, access identity 14, and access identity 15, respectively. A value 0 means that access attempt is allowed for the corresponding access identity and a value 1 means the access attempt is not allowed.

For example, the NW may configure for each access category and access identity its barring time. The UE randomly generate the time based on the barring time.

In some example embodiments, the network side may configure dedicated UAC parameters for the access attempt. For example, the network side may transmit or update the UAC parameters to the terminal device through a suitable message in a suitable occasion. In some example embodiments, the terminal device 110 may receive, from the network device 120, the UAC parameters in advance (before needing to update the timing related status). In some example embodiments, the terminal device 110 may receive, from another network device, the UAC parameters in advance (for example, before a change of the timing related status occurs).

In some example embodiments, the access attempt contains information on a connection establishment cause or a connection resume cause for a timing related status update access attempt, and the connection establishment cause or the connection resume cause is predefined. A new establishment/resume cause can be defined for access attempts triggered for timing related status update. Alternatively, the connection establishment cause or the connection resume cause is defined as mobile originating (MO) signaling. In other words, the connection establishment or the connection resume due to timing related status update may be classified into the same cause as MO signaling.

In some example embodiments, the terminal device may perform the access attempt for timing related status update to obtain detailed timing related status information from a network device, by for example initiating an random access procedure to get connected. In some example embodiments, the terminal device may perform the access attempt for timing related status update through a small data transmission (SDT) procedure, instead of get connected.

It should be noted that the process of performing the access attempt through a small data transmission (SDT) procedure to obtain detailed timing related information from a network device may be independent from the UAC framework. That is to say, when a terminal device decide to obtain detailed timing related information, it may use a small data transmission (SDT) procedure without performing access barring check. In other words, SDT may be used for this purpose to provide detailed timing related information as well to avoid getting connected.

In some example embodiments, if the access attempt for timing related status update is performed through a small data transmission (SDT) procedure, it may include a connection establishment cause or the connection resume in the SDT transmission to the network device. For example, it may reuse, an establishment/resume cause of MO signaling.

In some example embodiments, the terminal device 110 may receive, from the network device 120, configuration information indicating the terminal device to use an SDT procedure to obtain the detailed timing related status information. In other words, NW can configure the UE to use SDT for timing related status update and the terminal device can not use the SDT for this purposes if the terminal device is not configured this way.

In some example embodiments, for the access attempt for timing related status update, the terminal device may generate a random value and determine whether it is lower than a value indicated by uac-BarringFactor included in "UAC barring parameter". If yes, the terminal device 110 considers the access attempt as allowed; or otherwise, the terminal device 110 considers the access attempt as barred. In case when the access attempt is considered as barred, the terminal device may draw a random number 'rand' that is uniformly distributed in the range 0≤rand <1; then start timer T390 for the access category with the timer value calculated as follows, using the uac-BarringTime included in "UAC barring parameter":

$$T390=(0.7+0.6*\text{rand})*\text{uac-BarringTime}.$$

Upon initiation of the procedure, the UE shall: consider the access attempt as barred if timer T390 is running for the access category; or consider the access attempt as barred else if timer T302 is running and the access category is neither '2' nor '0': The access attempt may be performed after the expiration of T390, or it may perform another access control in similar way as described above.

Return to FIG. 2, experiencing the access control above, the terminal device 110 may transmit 220 a request to the network device 120 for detailed timing related information. Upon reception of the request, the network device 120 may transmit 225 the detailed timing related information (e.g. the latest clock quality information) to the terminal device 110.

In some example embodiments, the terminal device 110 may transmit, based on determining that another access attempt is triggered and allowed, to the network device, the request for the detailed timing related status information. In other words, when an access attempt is triggered for timing related status update and the UE is performing backoff due to the running T390 timer, but at the same time there is another access attempt triggered that is not barred (e.g. MO data), subject to UAC, or the access for such attempt is allowed, the UE may performs the access attempt and send a timing related status update request to the network.

Accordingly, upon reception of the request, the network can provide the detailed timing related status update, for example, the latest available clock quality information, to the UE.

In some example embodiments, the detailed timing related information provided by the network device may include timing synchronization status information, or RAN clock quality information, etc.

For example, the network device, may provide RAN's latest clock quality information to the UE in RRC_Connected state:

If the UE is subscribed for access stratum time synchronization (ASTI) in a unified data management (UDM), then the "Access and Mobility Subscription data" may additionally contain the following clock quality reporting control information:

- Clock quality detail level: indicates whether and which clock quality information to provide to the UE and can take one of the following values: clock quality metrics or acceptable/not acceptable indication;
- Clock quality acceptance criteria for the UE (if the clock quality level equals "acceptable/not acceptable indication": the clock quality acceptance criteria for the UE. Acceptance criteria may be defined based on, for example, any of the following attributes: time source, traceability to UTC or GNSS, synchronization state, clock accuracy, PTP clockClass, frequency stability. For example, it may include acceptable clock accuracy, acceptable frequency stability, etc.

In view of the above, it is seen that by means of the UAC framework, it may well support the access control on access attempts for timing related status update, which may reduce or even avoid possible congestion of the communication in an effective way while reusing the existing framework. Meanwhile, it also have less impact on the existing communication systems.

In some example embodiments, the access control may also be performed without relying on the UAC framework.

For example, the terminal device 110 may perform the access control by: generating a random value based on an upper limit value, and performing a back-off based on the generated random value. In other words, the UE may apply a default value for the backoff generation. For example, when UAC is not configured in the cell, the UE may apply a default value for the backoff generation. Herein, the default value or the upper limit value have the similar function of "uac-BarringFactor" mentioned above and may be used herein interchangeably.

In some example embodiments, the upper limit value may be one of: a predefined default value; a default value received from the network device over system information or a dedicated signaling. For example, the default value could be pre-defined in the specification, signalled by the network (e.g., over system information e.g. in the SIB together with the reference report ID when indicating there is new clock quality information available, or dedicated signalling), or determined by the UE.

In some example embodiments, a default value determined by the terminal device based on any of: a default paging cycle; a terminal device specific DRX period; a system information modification period; a type of service that the terminal device has; or a timer value as provided in Non-Access-Stratum (NAS).

Figure 3:
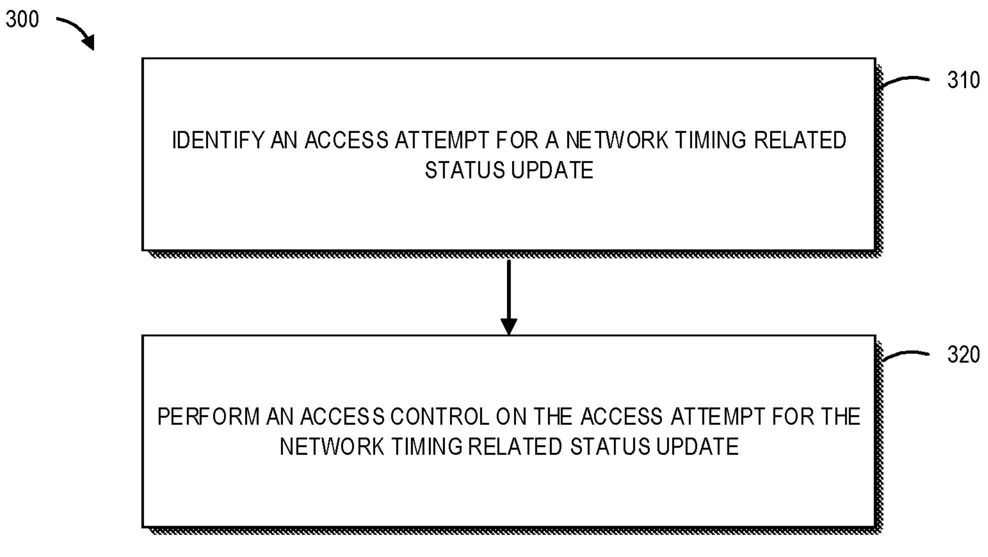
FIG. 3 illustrates an example flowchart of a method implemented at a terminal device according to example embodiments of the present disclosure.

FIG. 3 illustrates an example flowchart of a method 300 implemented at a terminal device according to example embodiments of the present disclosure. For the purpose of discussion, the method 300 will be described from the perspective of the terminal device 110 with reference to FIG. 1. It would be appreciated that although the method 300 has been described from the perspective of the terminal device 110, the method 300 may be performed by any other terminal device.

At 310, the terminal device 110 identify an access attempt for a network timing related status update. At 320, the terminal device 110 perform an access control on the access attempt for the network timing related status update.

In some example embodiments, the terminal device 110 may identify the access attempt based on one or more of an access category or an access identity, and wherein the access category and the access identity are mapped to a timing related status update access attempt.

In some example embodiments, a mapping of the access category or the access identity to a timing related status update access attempt may be predefined or preconfigured.

In some example embodiments, the access category or the access identity may be encoded in universal subscriber identity module (USIM).

In some example embodiments, the access control may be performed based on a unified access control (UAC) framework.

In some example embodiments, the terminal device 110 may further receive, from a network device, one or more UAC parameters dedicated for the access category or the access identity mapped to the timing related status update access attempt.

In some example embodiments, the access identity may be predefined as a reserved value for an access identity number in the UAC framework.

In some example embodiments, the access identity may be predefined as a used value for access identity number in the UAC framework.

In some example embodiments, the terminal device 110, the access attempt may contain information on a connection establishment cause or a connection resume cause for a timing related status update access attempt, wherein the connection establishment cause or the connection resume cause is predefined.

In some example embodiments, the connection establishment cause or the connection resume cause may be defined as mobile originating (MO) signaling.

In some example embodiments, the terminal device 110 may perform the access attempt through a small data transmission (SDT) procedure to obtain detailed timing related information from a network device.

In some example embodiments, the detailed timing related information includes timing synchronization status information, or RAN clock quality information.

In some example embodiments, the terminal device 110 further receive, from the network device, configuration information indicating the terminal device to use an SDT procedure to obtain the detailed timing related information.

In some example embodiments, the terminal device 110 further transmit, based on determining that another access attempt is triggered and allowed, to the network device, a request for detailed timing related information.

In some example embodiments, the terminal device 110, the performing an access control may comprise generating a random value for performing the access control based on an upper limit value.

In some example embodiments, the terminal device 110 the upper limit value may be one of: a predefined default value; a value received from the network device over system information or a dedicated signaling; or a value determined by the terminal device based on any of a default paging cycle; a terminal device specific DRX period; a system information modification period; a type of service that the terminal device has; or a timer value as provided in Non-Access-Stratum (NAS).

Based on the configured upper limit value, the terminal device may randomly generate a backoff time period for access attempt control. Upon expiry of the backoff time period, the terminal device may directly send a request for detailed timing related information. Or alternatively, the terminal device may first generate a random number and if the random number is lower than a predetermined number, a backoff time is further generated based on the random number. In such a case, upon expiry of the time period, try another access attempts.

All operations and features as described above with reference to FIG. 2 are likewise applicable to the method 300 and have similar effects. For the purpose of simplification, the details will be omitted.

Figure 4:
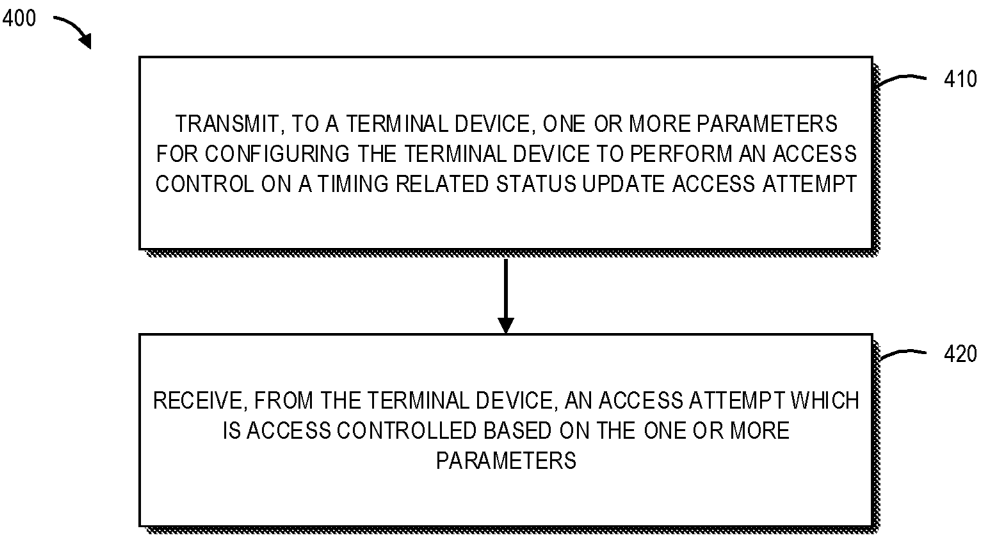
FIG. 4 illustrates an example flowchart of a method implemented at a network device, serving as a candidate cell, according to some other example embodiments of the present disclosure.

FIG. 4 shows a flowchart of an example method 400 implemented at a network device according to some example embodiments of the present disclosure. For the purpose of discussion, the method 400 will be described from the perspective of the network device 120 with reference to FIG. 1. It would be appreciated that although the method 400 has been described from the perspective of the network device 120, the method 400 may be performed by any other network device.

At 410, the network device 120 transmit, to a terminal device, one or more parameters for configuring the terminal device to perform an access control on a timing related status update access attempt. At 420, the network device 120 receive, from the terminal device, an access attempt which is access controlled based on the one or more parameters.

In some example embodiments, the access control is based on a unified access control (UAC) framework and the one or more parameters comprises: one or more UAC parameters dedicated for an access category or an access identity mapped to the timing related status update access attempt.

In some example embodiments, the network device 120 may further receive, from the terminal device, an access attempt including information on a connection establishment cause or a connection resume cause for a timing related status update access attempt, wherein the connection establishment cause or the connection resume cause is predefined.

In some example embodiments, the connection establishment cause or the connection resume cause may be predefined as mobile originating (MO) signaling.

In some example embodiments, the network device 120 may further transmit, to the terminal device, detailed timing related information based on the connection establishment cause or the connection resume cause as indicated in the access attempt.

In some example embodiments, the detailed timing related information may be transmitted to the terminal device through a small data transmission (SDT) procedure.

In some example embodiments, the network device further transmit, to the terminal device, configuration information indicating the terminal device to use an SDT procedure to obtain the detailed timing related information.

In some example embodiments, the one or more parameters may comprise an upper limit value which is to be used by the terminal device to generate a random value for performing the access control. As described above, the upper limit value may also be referred to as a default value used for, for example, generating an back off value.

In some example embodiments, the upper limit value may be one of: a predefined default value, a value received from the network device over system information or a dedicated signaling; or a value determined by the terminal device based on any of: a default paging cycle; a terminal device specific DRX period; a system information modification period; a type of service that the terminal device has; or a timer value as provided in Non-Access-Stratum (NAS).

In some example embodiments, the detailed timing related information includes timing synchronization status information, or RAN clock quality information.

For example, with the configured upper limit value, the terminal device may randomly generate a backoff time period for access attempt control. Upon expiry of the backoff time period, the terminal device may directly send a request for detailed timing related information. Or alternatively, the terminal device may first generate a random number and if the random number is lower than a predetermined number, a backoff time is further generated based on the random number. In such a case, upon expiry of the time period, try another access attempts.

All operations and features as described above with reference to FIG. 2 are likewise applicable to the method 400 and have similar effects. For the purpose of simplification, the details will be omitted.

In some example embodiments, an apparatus capable of performing any of operations of the method 300 (for example, the terminal device 110) may include means for performing the respective steps of the method 300. The means may be implemented in any suitable form. For example, the means may be implemented in a circuitry or software module.

In some example embodiments, the apparatus may comprises: means for identifying, by the terminal device, an access attempt for a network timing related status update; and means for performing, by the terminal device, an access control on the access attempt for the network timing related status update.

In some example embodiments, the apparatus may comprise means for identifying the access attempt based on one or more of an access category or an access identity, and wherein the access category and the access identity are mapped to a timing related status update access attempt.

In some example embodiments, a mapping of the access category or the access identity to a timing related status update access attempt may be predefined or preconfigured.

In some example embodiments, the access category or the access identity may be encoded in universal subscriber identity module (USIM).

In some example embodiments, the access control may be performed based on a unified access control (UAC) framework.

In some example embodiments, the apparatus may further comprise means for receiving, from a network device, one or more UAC parameters dedicated for the access category or the access identity mapped to the timing related status update access attempt.

In some example embodiments, the access identity may be predefined as a reserved value for an access identity number in the UAC framework.

In some example embodiments, the access identity may be predefined as a used value for access identity number in the UAC framework.

In some example embodiments, the access attempt may contain information on a connection establishment cause or a connection resume cause for a timing related status update access attempt, wherein the connection establishment cause or the connection resume cause is predefined.

In some example embodiments, the connection establishment cause or the connection resume cause may be defined as mobile originating (MO) signaling.

In some example embodiments, the apparatus may comprise means for performing the access attempt through a small data transmission (SDT) procedure to obtain detailed timing related information from a network device.

In some example embodiments, the apparatus further comprise means for receiving, from the network device, configuration information indicating the terminal device to use an SDT procedure to obtain the detailed timing related information.

In some example embodiments, the apparatus further comprise means for transmitting, based on determining that another access attempt is triggered and allowed, to the network device, a request for detailed timing related information.

In some example embodiments, the means for performing an access control may comprise means for generating a random value for performing the access control based on an upper limit value.

In some example embodiments, the upper limit value may be one of: a predefined default value; a value received from the network device over system information or a dedicated signaling; or a value determined by the terminal device based on any of a default paging cycle; a terminal device specific DRX period; a system information modification period; a type of service that the terminal device has; or a timer value as provided in Non-Access-Stratum (NAS).

In some example embodiments, the detailed timing related information includes timing synchronization status information, or RAN clock quality information.

In some example embodiments, the apparatus further comprises means for performing other steps in some embodiments of the method 300. In some embodiments, the means comprises at least one processor and at least one memory including computer program code. The at least one memory and computer program code are configured to, with the at least one processor, cause the performance of the apparatus.

In some example embodiments, the apparatus further comprises means for performing other steps in some embodiments of the method 300. In some embodiments, the means comprises at least one processor and at least one memory including computer program code. The at least one memory and computer program code are configured to, with the at least one processor, cause the performance of the apparatus.

In some example embodiments, an apparatus implemented at a terminal device is provided. The apparatus may include means for identifying, by the terminal device, an access attempt for a network timing related status update. The apparatus further comprises means for performing, by the terminal device, an access control on the access attempt for the network timing related status update. It is to be noted that this apparatus could be used separately from or in combination with the solutions described with reference to FIG. 2.

In some example embodiments, an apparatus capable of performing any of the method 400 (for example, the network device 120) may include means for performing the respective steps of the method 400. The means may be implemented in any suitable form. For example, the means may be implemented in a circuitry or software module.

In some example embodiments, the apparatus may comprise: means for transmitting, to a terminal device, one or more parameters for configuring the terminal device to perform an access control on a timing related status update access attempt; and means for receiving, from the terminal device, an access attempt which is access controlled based on the one or more parameters.

In some example embodiments, the access control is based on a unified access control (UAC) framework and the one or more parameters comprises: one or more UAC parameters dedicated for an access category or an access identity mapped to the timing related status update access attempt.

In some example embodiments, the apparatus may further comprise: means for receiving, from the terminal device, an access attempt including information on a connection establishment cause or a connection resume cause for a timing related status update access attempt, wherein the connection establishment cause or the connection resume cause is predefined.

In some example embodiments, the connection establishment cause or the connection resume cause may be predefined as mobile originating (MO) signaling.

In some example embodiments, the apparatus may further comprise: means for transmitting, to the terminal device, detailed timing related information based on the connection establishment cause or the connection resume cause as indicated in the access attempt.

In some example embodiments, the detailed timing related information may be transmitted to the terminal device through a small data transmission (SDT) procedure.

In some example embodiments, the apparatus may further comprise: means for transmitting, to the terminal device, configuration information indicating the terminal device to use an SDT procedure to obtain the detailed timing related information.

In some example embodiments, the one or more parameters may comprise an upper limit value which is to be used by the terminal device to generate a random value for performing the access control.

In some example embodiments, the upper limit value may be one of: a predefined default value, a value received from the network device over system information or a dedicated signaling; or a value determined by the terminal device based on any of: a default paging cycle; a terminal device specific DRX period; a system information modification period; a type of service that the terminal device has; or a timer value as provided in Non-Access-Stratum (NAS).

In some example embodiments, the detailed timing related information includes timing synchronization status information, or RAN clock quality information.

In some example embodiments, the apparatus further comprises means for performing other steps in some embodiments of the method 400. In some embodiments, the means comprises at least one processor and at least one memory including computer program code. The at least one memory and computer program code are configured to, with the at least one processor, cause the performance of the apparatus.

In some example embodiments, an apparatus implemented at a network device is provided. The apparatus may include means for transmitting, to a terminal device, one or more parameters for configuring the terminal device to perform an access control on a timing related status update access attempt. The apparatus further comprises means for receiving, from the terminal device, an access attempt which is access controlled based on the one or more parameters. It is to be noted that this apparatus could be used separately from or in combination with the solutions described with reference to FIG. 2.

Figure 5:
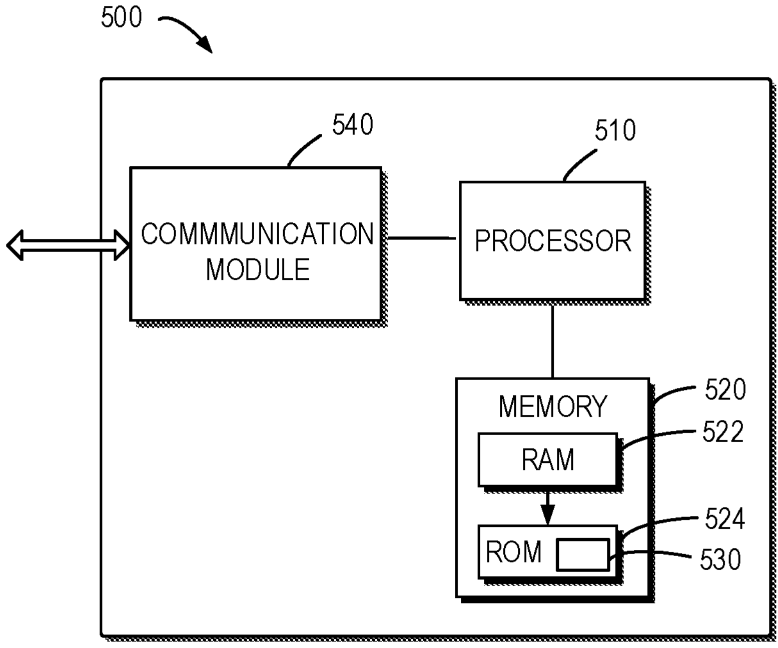
FIG. 5 illustrates an example simplified block diagram of a device that is suitable for implementing embodiments of the present disclosure.

FIG. 5 is a simplified block diagram of a device 500 that is suitable for implementing embodiments of the present disclosure. The device 500 may be provided to implement the communication device, for example the terminal device 110 or the network device 120 as shown in FIG. 1. As shown, the device 500 includes one or more processors 510, one or more memories 520 which may be coupled to the processor 510, and one or more transmitters and/or receivers (TX/RX) 540 (communication module(s)) which may be coupled to the processor 510.

The TX/RX 540 is for bidirectional communications. The TX/RX 540 has at least one antenna to facilitate communication. The communication interface may represent any interface that is necessary for communication with other network elements. The communication interface may be hardware or software based interface. For example, the communication interface may be one or more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a read only memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 730 into the RAM 522.

The embodiments of the present disclosure may be implemented by means of the program so that the device 500 may perform any process of the disclosure as discussed with reference to FIG. 2. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Figure 6:
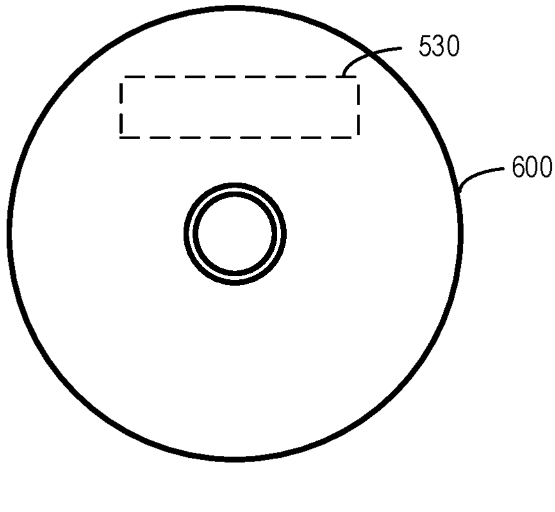
FIG. 6 illustrates an example block diagram of an example computer readable medium in accordance with some embodiments of the present disclosure.

FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 3 and FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:

at least one processor; and at least one memory storing instructions that, when executed with the at least one processor, cause the terminal device at least to:

identify an access attempt for a network timing related status update; and perform an access control on the access attempt for the network timing related status update, wherein the access attempt is identified based on one or more of an access category or an access identity, and wherein the access category and the access identity are mapped to a timing related status update access attempt.

2. The terminal device of claim 1, wherein a mapping of the access category or the access identity to the timing related status update access attempt is predefined or preconfigured.

3. The terminal device of claim 1, wherein the access category or the access identity is encoded in universal subscriber identity module.

4. The terminal device of claim 3, wherein the terminal device is further caused to receive, from a network device, one or more UAC parameters dedicated for the access category or the access identity mapped to the timing related status update access attempt.

5. The terminal device claim 1, wherein the access control is performed based on a unified access control (UAC) framework.

6. The terminal device of claim 5, wherein the access identity is predefined as a reserved value for an access identity number in the UAC framework.

7. The terminal device of claim 5, wherein the access identity is predefined as a used value for an access identity number in the UAC framework.

8. The terminal device of claim 1, wherein the access attempt contains information on a connection establishment cause or a connection resume cause for the timing related status update access attempt, wherein the connection establishment cause or the connection resume cause is predefined.

9. The terminal device of claim 8, wherein the connection establishment cause or the connection resume cause is defined as mobile originating signaling.

10. The terminal device of claim 1, wherein the terminal device is caused to:

perform the access attempt through a small data transmission (SDT) procedure to obtain detailed timing related information from a network device.

11. The terminal device of claim 10, wherein the terminal device is further caused to:

receive, from the network device, configuration information indicating the terminal device to use the SDT procedure to obtain the detailed timing related information.

12. The terminal device of claim 1, wherein the terminal device is further caused to:

transmit, based on determining that another access attempt is triggered and allowed, to a network device, a request for detailed timing related information.

13. The terminal device of claim 10, wherein the detailed timing related information includes timing synchronization status information, or radio access network clock quality information.

14. The terminal device of claim 1, wherein the performing the access control comprises causing the terminal device to:

generate a random value for performing the access control based on an upper limit value.

15. The terminal device of claim 14, wherein the upper limit value is one of:

a predefined default value;

a value received from a network device over system information or a dedicated signaling; or a value determined with the terminal device based on any of:

a default paging cycle;

a terminal device specific discontinuous reception period;

a system information modification period;

a type of service that the terminal device has; or a timer value as provided in Non-Access-Stratum.

16. A network device, comprising:

at least one processor; and at least one memory storing instructions that, when executed with the at least one processor, cause the network device at least to:

transmit, to a terminal device, one or more parameters for configuring the terminal device to perform an access control on a timing related status update access attempt; and receive, from the terminal device, an access attempt which is access controlled based on the one or more parameters, wherein the access attempt is identified based on one or more of an access category or an access identity, and wherein the access category and the access identity are mapped to the timing related status update access attempt.

17. The network device of claim 16, wherein the access control is based on a unified access control (UAC) framework and the one or more parameters comprises:

one or more UAC parameters dedicated for the access category or the access identity mapped to the timing related status update access attempt.

18. The network device of claim 16, wherein the access attempt includes information on a connection establishment cause or a connection resume cause for the timing related status update access attempt, wherein the connection establishment cause or the connection resume cause is predefined.

19. A method performed with a terminal device, comprising:

identifying, with the terminal device, an access attempt for a network timing related status update; and performing, with the terminal device, an access control on the access attempt for the network timing related status update, wherein the access attempt is identified based on one or more of an access category or an access identity, and wherein the access category and the access identity are mapped to a timing related status update access attempt.

20. The method of claim 19, wherein the access attempt contains information on a connection establishment cause or a connection resume cause for the timing related status update access attempt, wherein the connection establishment cause or the connection resume cause is predefined.

* * * * *